United States Patent [19]

Dewey

[11] Patent Number: 5,412,668
[45] Date of Patent: May 2, 1995

[54] PARITY STRIPING FEATURE FOR OPTICAL DISKS

[75] Inventor: Douglas W. Dewey, Tucson, Ariz.

[73] Assignee: International Business Machines Corporation, Armonk, N.Y.

[21] Appl. No.: 310,541

[22] Filed: Sep. 22, 1994

[51] Int. Cl.$^6$ .......................................... H03M 13/00
[52] U.S. Cl. ................................. 371/40.1; 371/10.1; 371/49.1
[58] Field of Search .................... 371/39.1, 38.1, 40.1, 371/10.1, 11.1, 10.2, 13, 68.1, 51.1, 21.2, 49.1; 364/243.1, 248.1, 268.5, 265.3, 266.3, 269.2, 944, 952.1, 964.7; 395/575; 369/54; 360/48

[56] References Cited

U.S. PATENT DOCUMENTS

| | | | |
|---|---|---|---|
| 4,761,785 | 8/1988 | Clark et al. | 371/51 |
| 5,088,081 | 2/1992 | Farr | 369/54 |
| 5,124,987 | 6/1992 | Milligan et al. | 371/10.1 |
| 5,128,912 | 7/1992 | Hug et al. | 369/38 |
| 5,130,992 | 7/1992 | Frey, Jr. et al. | 371/401 |
| 5,148,432 | 9/1992 | Gordon et al. | 371/10.1 |
| 5,191,584 | 3/1993 | Anderson | 371/51.1 |
| 5,202,799 | 4/1993 | Hetzler et al. | 360/48 |
| 5,208,813 | 5/1993 | Stallmo | 371/10.1 |
| 5,233,618 | 8/1993 | Glider et al. | 371/68.1 |
| 5,235,601 | 8/1993 | Stallmo et al. | 371/40.1 |
| 5,274,799 | 12/1993 | Brant et al. | 395/575 |
| 5,333,143 | 7/1994 | Blaum et al. | 371/40.4 |
| 5,341,381 | 8/1994 | Fuller | 371/10.1 |
| 5,351,246 | 9/1994 | Blaum et al. | 371/10.1 |
| 5,379,417 | 1/1995 | Lui et al. | 395/575 |

OTHER PUBLICATIONS

PC Magazine, Sep. 14, 1993, "Mylex DAC960 Disk Array Subsystem/Storage Dimensions LANStor Continua Disk Array", pp. 276, 277, 289 and 306.
IBM Technical Disclosure Bulletin, vol. 24, No. 2, Jul. 1981, F. D. Lawlor, "Efficient Mass Storage Parity Recovery Mechanism", pp. 986, 987.
Research Disclosure, Jun. 1984, No. 242, Havant, Hampshire, Great Britain, "Cartridge Library System", p. 273.

Primary Examiner—James P. Trammell
Attorney, Agent, or Firm—Baker, Maxham, Jester & Meador

[57] ABSTRACT

An apparatus and method for performing parity striping of optical disks for error recovery and data reconstruction. A parity group is created by identifying volumes and then setting a parity flag to indicate whether the data has been updated since a most recent writing of parity information. Parity striping is performed either partially or fully off-line or upon exporting the parity group from the storage array. The striping involves calculating parity, which may be done by Exclusive Or'ing the data and then writing parity to a parity disk. In one embodiment, the invention is implemented with any array of redundant optical disks. In another embodiment the invention is implemented with a redundant array of independent libraries. In either embodiment, striping may be performed when the media is archived to an external shelf. When the invention is implemented with a redundant array of independent libraries, striping may be performed in an intermittent fashion during background time. Intelligence is provided so that the striping method is employed with knowledge regarding the media format. In the case of magneto-optical media this means that the system is capable of recognizing pre-erased sectors. The system utilizes the format to reduce the work of striping and reconstruction. Because the system is programmed to recognize the pre-erased sectors, no error recovery is induced.

36 Claims, 9 Drawing Sheets

PARITY STRIPING FEATURE FOR OPTICAL DISKS

BACKGROUND OF THE INVENTION

1. Field of the Invention

The present invention pertains to optical storage media for computers, and in particular is concerned with error recovery and data reconstruction schemes for optical disks which is particularly useful in automated storage libraries.

2. Description of the Related Art

Several techniques for error recovery and data reconstruction of data stored on disks are presently known. Reliable techniques include disk mirroring and the use of redundant arrays of inexpensive disks (RAID). Each technique has its own merits and disadvantages, but no known technique is particularly well suited to optical disks because of their unique data format. Additionally, optical disks are often dispersed among several storage areas that are accessed by one or more robotic mechanisms controlled by a central computer. These storage areas are referred to as automatic media storage libraries, or automated libraries. A concept, analogous to RAID, called redundant arrays of inexpensive libraries (RAIL) allows multiple storage libraries to be controlled by one central computer; however, known RAID techniques for error recovery and data construction are inefficient when applied to optical media stored in redundant libraries due to the large number of disks involved.

Figure 1:
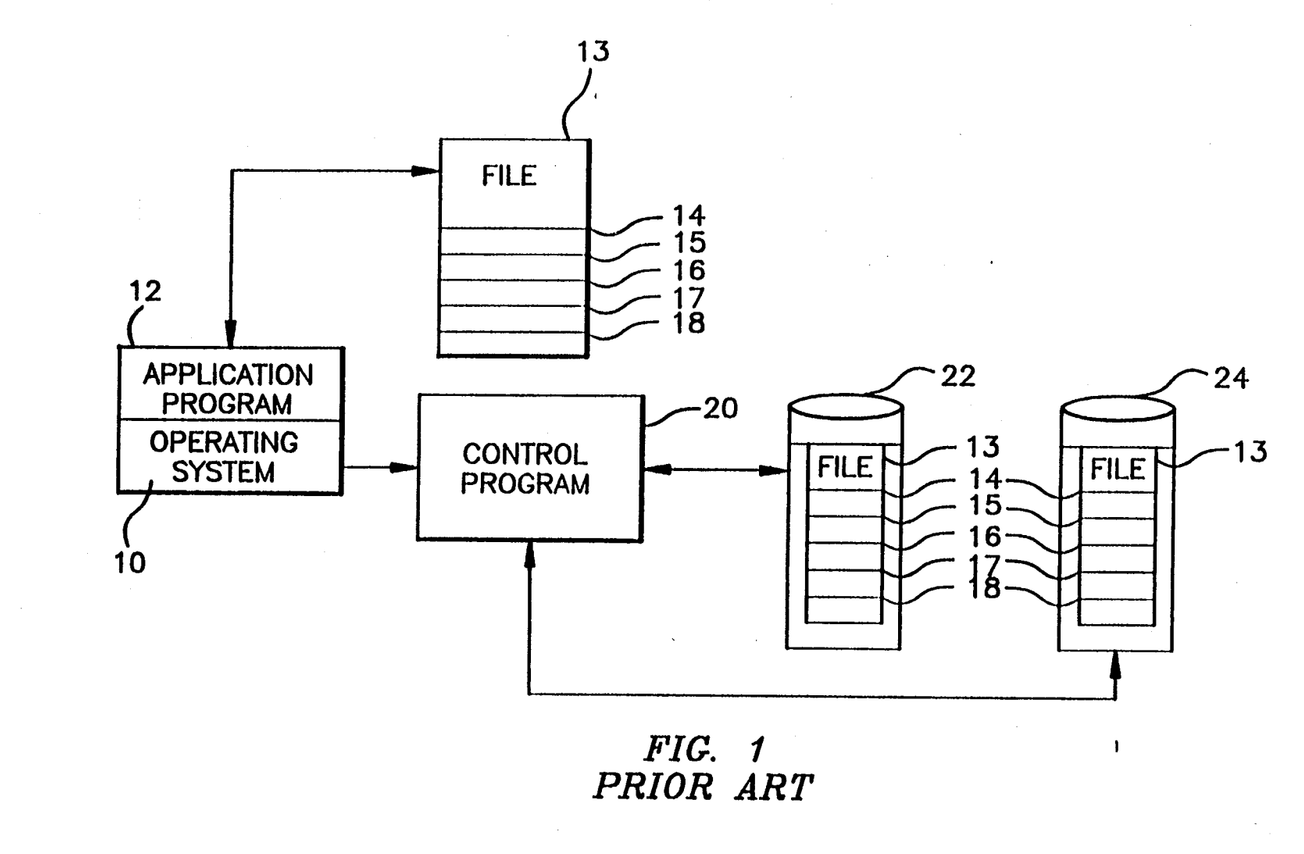
FIG. 1 shows a prior art data reconstruction technique using disk mirroring.

Referring to FIG. 1, a prior art example of a disk mirroring system is shown. File 13 is written by an application program 12, and then sent by an operating system 10 to a control program 20. The control program simultaneously sends identical copies of the file to the drives 22 and 24. The copy of the file stored on drive 22 is "mirrored" by the copy stored on drive 24. In this example, the two drives 22 and 24 represent the minimum configuration for mirroring. Mirroring can be used to improve performance in normal operation. For example, when a file is to be read from mirrored disks 22 and 24, the control program 20 reads alternate file clusters simultaneously from each of the drives and passes them by way of the operating system to an application program. For example, clusters 14, 16 and 18 are read from the copy of file 13 on disk 22 while clusters 15 and 17 are read from the copy of file 13 on disk 24. Obviously if three or more drives are used for mirroring then the performance of a file is increased; however, the trade-off is that the cost also increases with the addition of each disk. Mirroring is especially useful when a read failure occurs, such as one caused by a media surface defect or by a read head "crash". In either case, the whole intact file 13 can be recovered from the other disk. Further, if the failure is due to a media defect, then control program 20 may repair the disk experiencing the error by rewriting the missing data from file 13 stored on the undamaged disk. The primary disadvantage of mirroring is cost. A dedicated disk drive must be available to replicate each disk drive of interest.

Another technique used for error recovery and data reconstruction, less expensive than mirroring, is known as Redundant Array of Inexpensive Disks (RAID). A research group at the University of California, Berkeley, in a paper entitled "A Case for Redundant Arrays of Inexpensive Disks (RAID)", Patterson et al., *Proc. ACM SIGMOD*, June 1988, describes this technique. A RAID 1 architecture is essentially disk mirroring described above. A RAID 2 architecture uses "bit striping" in which each bit of each word of data plus error detection and correction (EDC) bits for each word are stored on separate disk drives. For example, a 32-bit data word might have 7 EDC bits added using the known "Hamming code" technique. The 39-bit word must then be written one bit per disk drive onto 39 disk drives. If one of the 39 disk drives fail, a control program may use the remaining 38 bits of each stored 39-bit word to reconstruct each 32-bit data word. A significant drawback of RAID 2 architecture is that a large number of disk drives are required, and that seven of the drives must be dedicated to bit striping EDC data.

U.S. Pat. No. 4,092,732 to Ouchi describes a RAID 3 architecture. RAID 3 architecture is the predecessor to more recent generations of RAID architecture, including the widely implemented RAID 5 architecture. RAID 3 architecture is based on internal error detection and correction, so that it is not necessary to provide extra error detection and data correction, as in RAID 2 architecture.

Figure 2:
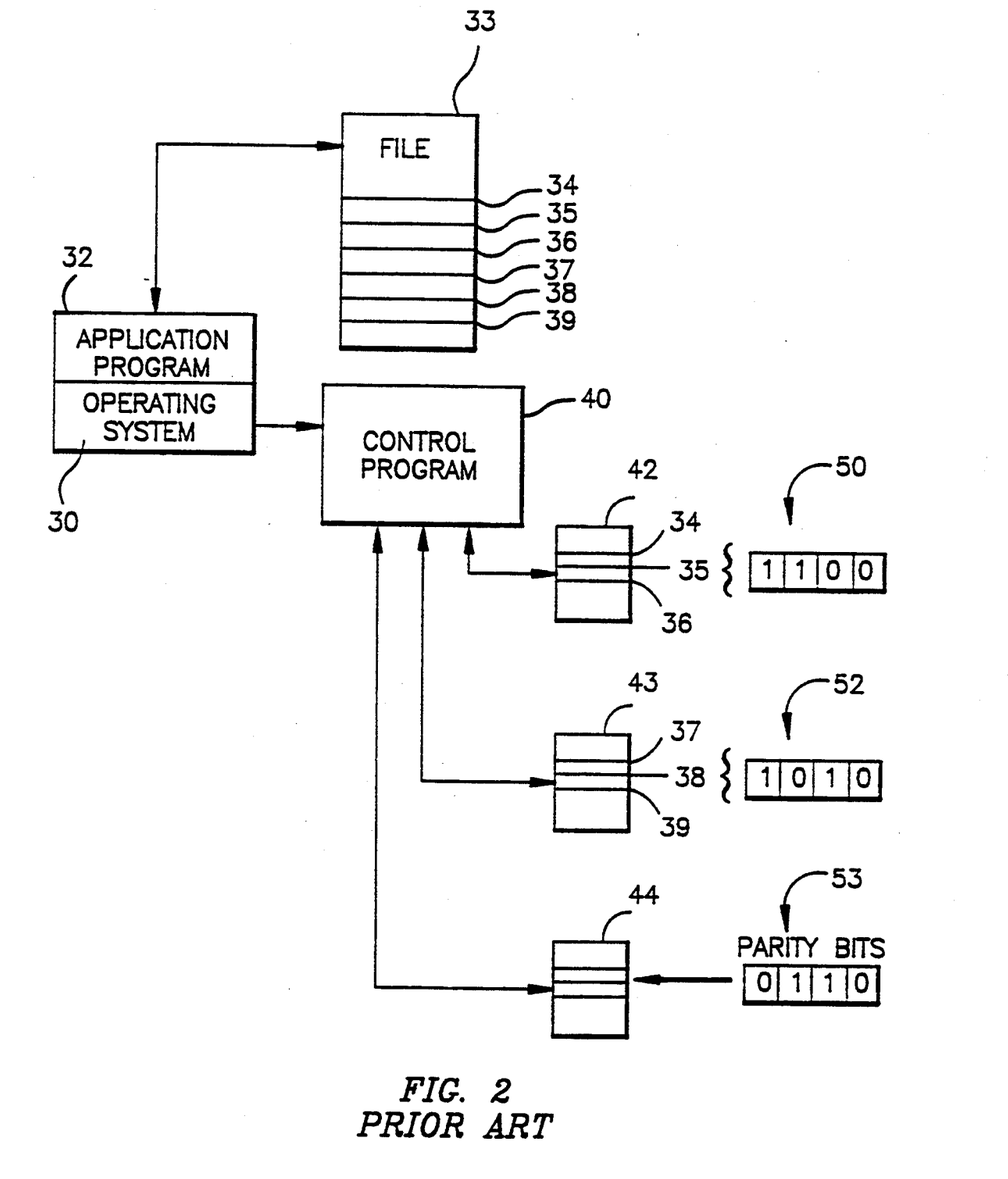
FIG. 2 shows another prior art data reconstruction technique using parity striping with a redundant array of inexpensive disks.

Referring to FIG. 2, an example of a direct descendant of a RAID 3 type architecture is shown. A file 33 is written by an application program 32 and eventually passed to control program 40 for storage on a disk. The control program simultaneously sends one-half of the file clusters (34, 35, and 36) to drive 42 and the other half (37, 38, 39) to drive 43. Drive 44, which does not receive file data, is reserved as the "parity" drive. The control program 40 performs an Exclusive OR (XOR) operation on the data being written to drives 42 and 43. The result is parity data, written to drive 44. An XOR operation results in a "0" bit whenever two identical bits are compared, and a "1" bit whenever two dissimilar bits are compared. For example, cluster 34 of file 33 contains the byte 50 comprised of the bits "1100", and cluster 37 contains the byte 52 comprised of bits "1010". An XOR operation yields the following parity bits 53 comprised of "0110". This parity information written to the parity drive can be used to reconstruct the data in the event of a read failure by performing a reverse XOR operation of the undamaged bits with the parity bits. Three is the minimum number of drives for a RAID 3 architecture, but there is no maximum limit. However, there is a marked decrease in performance caused by an increase in the number of drives to which parity bits must be written. If there are more than three drives in an array, the first two are XORed and that result is XORed with the next drive, and so on until all the drives containing data have been XORed and the final result written to a parity disk. An obvious advantage of RAID 3 architecture is that for "N" number of disk drives, only one additional parity drive is required. Thus "N+1" disk drives define a "redundancy group". On the other hand the disadvantage of RAID 3 architecture is the performance overhead required to read each bit of data, perform multiple XOR operations, and write the data to a parity disk.

U.S. Pat. No. 4,761,785 to Clark et al. describes a RAID 5 architecture in detail. A RAID 5 architecture revises the RAID 3 scheme by distributing the data and parity information across all available disk drives. Typically, a redundancy group of "N+1" drives are divided into a plurality of equally sized address areas known as "blocks". Each drive generally contains the same number of blocks. Blocks from each storage unit in a redundancy group having the same unit address ranges are referred to as "stripes". Each stripe has N blocks of data, plus one parity block on one drive containing parity for the remainder of the stripe. This technique is commonly referred to as "parity striping". Further stripes each have a parity block, the parity blocks being distributed on different storage units. In this way, no single unit is burdened with all of the parity update activity. A limitation of RAID 5 architecture is that a change in a data block requires a considerable performance overhead, as both the parity block and data block must be read and XORed, and the result XORed with new data. Then both the result (the new parity block) and the new data must be written to disk drives. Any requests to read or write new data during the period when parity is being updated must wait until updating is completed. This performance overhead is commonly referred to as the RAID write penalty.

A method for parity protecting distributed files in a parallel network is disclosed in U.S. Pat. No. 5,130,992 to Frey et al. This invention is useful for spreading parity among a large number of devices; however, the '992 invention involves updating a parity block whenever data is written in a file that is parity protected. The disadvantage of immediate updating is the overall impact to system performance as the data is read, a parity operation performed, and the new data is written. Another method which builds on RAID 5 techniques to reconstruct redundancy information during normal or "online" operation is described in U.S. Pat. No. 5,235,601 to Stallmo et al. Applying such an "online" technique to a large number of disks (e.g. in a storage library) would also have the inherent disadvantage of slowing throughput, because a parity update would be required for numerous disks after every write operation.

A method of reconstructing data without the necessity of continuously updating a parity redundancy is disclosed in U.S. Pat. No. 5,124,987 to Milligan et al. The '987 invention involves writing new or modified data to non-permanent electronic memory, in the form of "logical tracks". A background process compares the new data on a "logical track" to any old data stored in a previous write and removes the old data. The data is periodically written to physical tracks which serve as redundancy drives. By using logical memory to perform periodic reads, the '987 method improves performance over conventional raid techniques that use only disk memory for storing redundancy information. However, the tradeoff is the inherent risk of relying on volatile non-permanent memory for data construction. There is a risk that the contents of volatile electronic memory will be lost once power is interrupted.

RAID techniques have typically been used with magnetic drives, such as the type of Direct Access Storage Disks (DASD) units, which are often used as conventional hard drives in personal computers. RAID architecture is not typically employed in magneto-optical units, because these units have pre-erased sectors. The pre-erased sectors are usually created before shipping and a formatting operation is employed to ensure that the pre-erase has been completed. The pre-erase creates all 0's throughout the disk. This is done because of an inherent inability of a laser beam used in magnetic-optic technology to write 0's and 1's simultaneously. Typically, a full revolution of the disk is required for a "write pass" (writing 1's) and another revolution is required for an "erase pass" (writing 0's). To avoid the erase pass, the disk is pre-erased before any writing of data is allowed. As data accumulates, the area devoted to pre-erased sectors decreases but the presence of them presents a problem for calculating parity. The pre-erased sectors contain logical blocks of data that would be treated as "0"'s in a conventional parity striping algorithm. The resulting overhead involved with creating parity data for a block of "0"'s is completely unnecessary, since the data will not change as long as the sector remains erased. Alternatively, the pre-erased sectors might send a conventional RAID parity striping program into error recovery mode, reducing performance and inducing errors itself. Entering error recovery mode reduces performance and therefore should be avoided if possible.

SUMMARY OF THE INVENTION

One objective of the present invention is to apply a reliable "parity striping" feature for optical disks without increasing performance overhead.

Another objective of the present invention is to apply parity striping to optical disks without inducing errors caused by reading pre-erased sectors.

Another objective of the present invention is to allow "parity striping" to occur for optical disks stored in a Redundant Array Inexpensive Library (RAIL) scheme without significant performance overhead.

In accordance with these objectives, the invention provides an apparatus and method for performing parity striping of optical disks, which is done either partially or fully off-line or upon exporting a parity group from the storage array. In one embodiment, the invention is implemented with any array of redundant optical disks. In another embodiment the invention is implemented with a redundant array of independent libraries. In either embodiment, striping may be performed only when the media is archived to an external shelf. Advantageously, the creation of a parity striping redundancy groups upon export does not impact the performance of the system. Further, the technique is reliable since data is written to permanent storage on optical disks, rather than relying on electronic memory to store redundancy data.

A striping method and apparatus which is "aware" of the media format for the data is capable of recognizing pre-erased sectors inherent to magneto-optical media. The utility utilizes the format to reduce the work of striping and reconstruction. Because the system is programmed to recognize the pre-erased sectors, no error recovery is induced. When the parity information is created, the location of data blocks having pre-erased sectors is recorded in memory. A map of these locations referred to as a free space map is stored in memory. The map is referred to when calculating parity so that it is not necessary to read the area allocated to pre-erased sectors. The map is used to avoid errors which would be induced if the pre-erased area was read prior to calculating parity, and to allow parity calculation to precede in an expedient fashion.

The foregoing, together with other objects, features and advantages of this invention, will become more apparent when referring to the following specification, claims and the accompanying drawings.

BRIEF DESCRIPTION OF THE DRAWING

FIG. 4b is a more detailed sketch of the data format of the exemplary data storage medium shown in FIG. 4a;

DETAILED DESCRIPTION OF THE PREFERRED EMBODIMENTS

Figure 3:
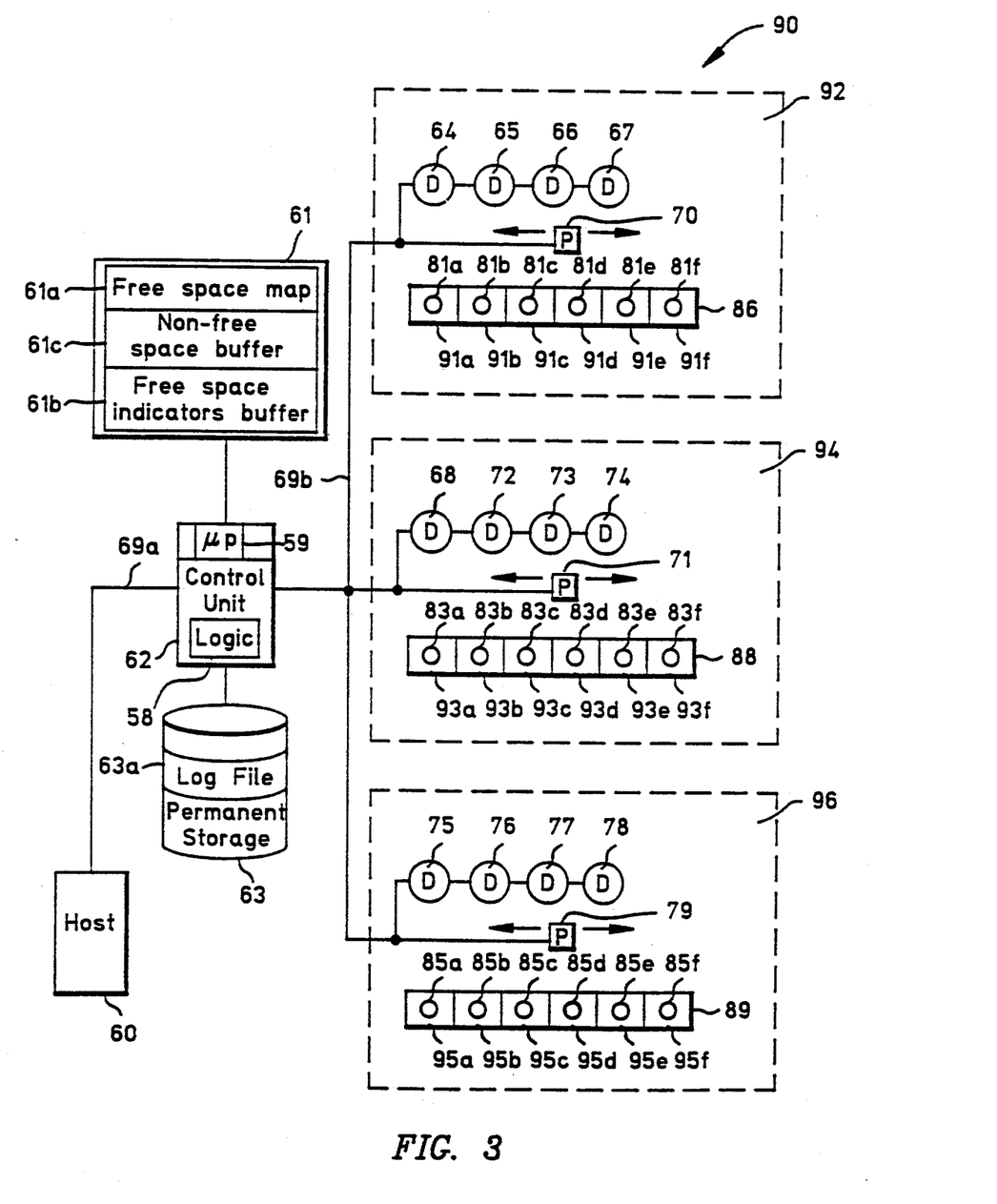
FIG. 3 shows a redundant array of inexpensive libraries storing optical disks that is useful with the present invention.

Referring to FIG. 3, a redundant array of optical storage libraries is shown. It should be noted that the invention may be employed to build parity data for any plurality of data storage mediums. However, the invention is particularly advantageous for management of parity data for a library type environment. The present invention is particularly useful with optical media stored in redundant libraries. However, the invention is also useful when employed in an environment of only one library, such as a library 92. For exemplary purposes an array of libraries containing one or more libraries is shown. The combination of libraries 92, 94, and 96 form a known RAIL architecture which is useful for implementing the present invention. Exemplary library 92 contains a plurality of drives 64–67 used for reading and writing data on one or more data storage mediums, such as mediums 81a-f. The mediums 81a-f are each stored in a respective storage bin 91a-f. The bins collectively form storage unit 86. The quantity of bins shown is merely for illustration and in actual practice may be more or less than the quantity shown. Regarding terminology the data stored on a data storage medium, such as medium 81a, is referred to as a "volume". For purposes of this disclosure the term volume is used interchangeably with data storage medium as a short way of referring to data stored on a particular medium. In a similar fashion, data volumes 83a-f are stored in bins 93a-f, respectively. The bins 93a-f collectively form storage unit 88 in library 94. Likewise in library 96, volumes 85a-f are stored in bins 95a-f, respectively, and the bins form storage unit 89.

A library control unit 62, which may be a personal computer, such as an IBM PS/2, is shown coupled to a host processing unit 60 through an input/output (I/O) channel 69a. The host may be, for example, an IBM 3090. A host computer, such as the IBM 3090, has within it code for processing job requests within a data storage library. The control unit 62 is used to process commands from the host 60, and to manage each respective library 92–96 through special control logic 58 which is part of the control unit. The control logic 58 may be hardware or software and is used for implementing the methods described in this disclosure. The control unit 62 through logic 58 controls an automatic robotic picker and a plurality of drives in of one of the libraries, such as library 92, through control bus 69b. In a preferred embodiment, the logic 58 is implemented as software in the known C programming language. One skilled in the art will recognize that the logic 58 could also be implemented in a microprocessor 59 as microcode (not shown). Electronic memory 61, which may be conventional random access memory (RAM), is part of the control unit 62. In a preferred embodiment the software embodying the logic 58 is loaded in the electronic memory 61 for execution. The electronic memory could be implemented as volatile or nonvolatile cache, however, a conventional RAM configuration is preferred because it is typically less expensive, and is adequate for implementing the method of the invention. The memory 61 is also used for storing information obtained during a read of data stored on an optical storage medium, such as medium 81A, which will be used to read and calculate parity data. A permanent storage unit 63, which may be a conventional hard drive, is coupled to the control unit 62 for storing host updates and other information related to updating data and parity. The logic 58 may be stored as a software program on storage unit 63 so that it is available for loading the logic into the electronic memory. The logic as a software program is executed by a control microprocessor 59. The microprocessor can be any conventional microprocessor such as an Intel 80486 available from the Intel Corporation.

Several automated storage libraries are known. IBM Corporation introduced the 3850 mass storage subsystem for retrieval of magnetic tape modules in the 1970s. More recently, several automated storage libraries for magnetic tape cartridges and optical disks have been introduced. Examples of optical disk libraries can be found in U.S. Pat. Nos. 4,974,156 and 4,945,428 assigned to the assignee of the present invention. Also systems for general automated libraries capable of handling either tapes or optical disks are described in U.S. Pat. Nos. 5,121,483 and 5,197,055, also assigned to the assignee of the present invention. The robotic picker mechanisms of these libraries include one or more grippers. Each gripper is capable of handling one data storage medium at a time. By grasping a data volume with a gripper, a picker can retrieve a volume from a storage bin and place it in a drive unit. A library useful for implementing the invention, such as library 92, may be any one of these known libraries.

Each library 92, 94, and 96 has a dedicated robotic picker 70, 71 and 79 respectively. In the event of a picker failure the data stored in respective storage units 86, 88 and 89 in each library would be inaccessible. However, the present invention enables accessing of the data by distributing parity information outside of the library. For example, in the event of a mechanical failure of picker 70 belonging to library 92, data for which a redundancy group has been created and stored outside the library could then be loaded into library 94 by picker 71. The data could then be read in a particular drive or drives in library 94, such as drives 68–74. A similar arrangement in library 96 allows reading of data on a storage medium, such as medium 85a, on drives 75–78. Physical and logical data formats of data storage mediums useful for implementing the present invention are described below.

Data Format of Data Storage Mediums

Figure 4A:
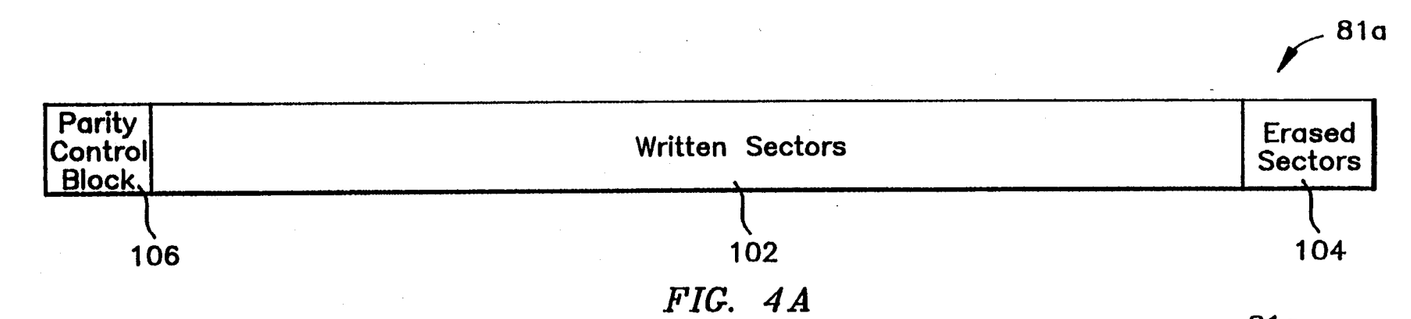
FIG. 4a is a simplified sketch of a data format for storing data on an example of a data storage medium useful in the present invention.

Referring to FIGS. 4a and 3, an example of a file system format for an exemplary optical data medium, volume 81a, is shown. FIG. 4a shows a physical representation of the data format on the volume 81a. The volume 81a is shown for the sake of simplicity as representative of the preferred format for all of the volumes used to implement the present invention. In a preferred embodiment, the present invention is useful with a known fixed block architecture (FBA) format; however, the invention is also useful with other known formats such as count key data (CKD) format. A parity_control_block 106 is used to define control parameters related to creating parity, and is created by control logic 58 to enable the methods of the present invention. The remaining blocks shown comprising addressable space on represented volume 81a are known data structures common to optical data storage mediums, where the data blocks are arranged according to the preferred FBA format. The parity_control_block is used to manipulate the data blocks in heretofore unknown ways to create parity data. A physical block 102 representing written sectors is available for storing user data and system control data. A physical block 104 representing pre-erased sectors is used to represent those sectors erased during a formatting operation of optical disks, such as those used in magneto-optical technology. However, the invention is useful with any technology which has erased sectors and is therefore not limited to just optical disks. A convenient choice for the size of a sector in the preferred FBA format is 1024 bytes. Within the entire volume 81a there is a plurality of sectors which may be addressed by specifying a "range", where a range denotes a contiguous set of sectors, for example a range may be specified to equate to 64 contiguous sectors on volume 81a. A plurality range spanning the entire volume 81a comprises all sectors contained in physical blocks 102 and 104.

Figure 4B:
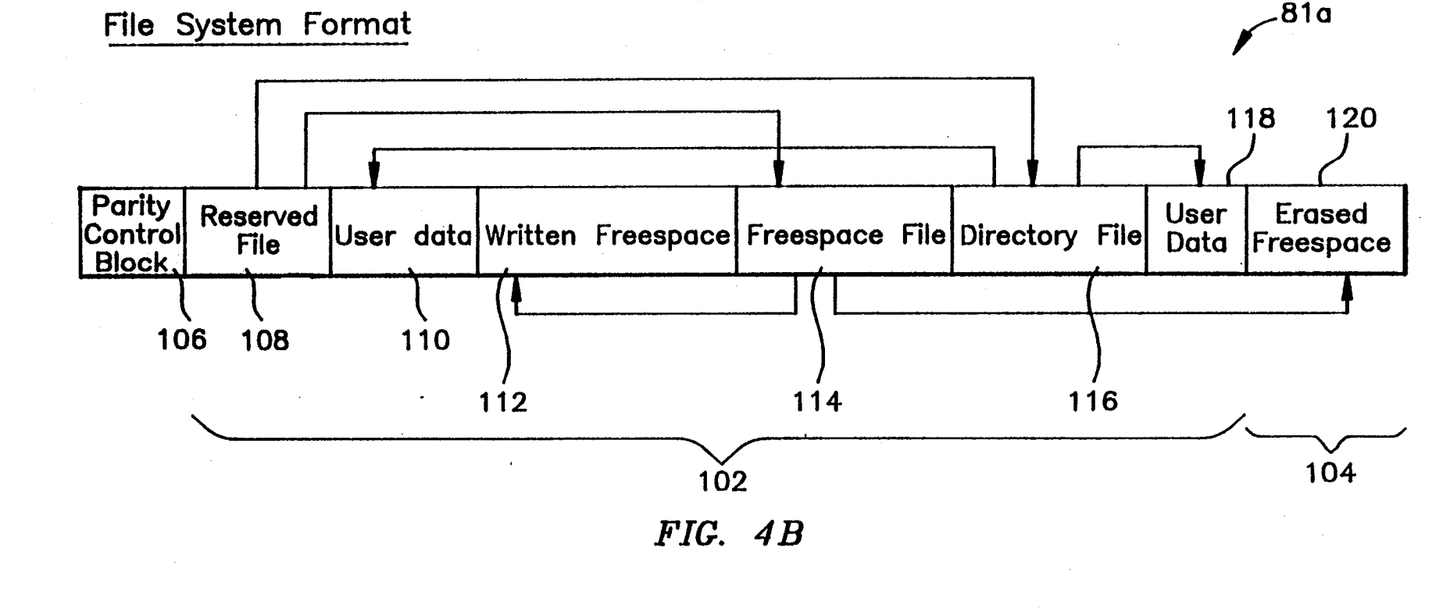

Referring to FIG. 4b, a detailed logical depiction of the data format of volume 81a is shown, which includes logical data shown in blocks 106-120. The physical written sectors block 102 is shown comprised of a plurality of logical blocks 108-118. A "reserved file" block 108 is used to store system control information which is not particularly relevant to the implementation of the present invention. A pair of "user data" blocks 110 and 118 are each used to store data written by a user application. There may be more than the single pair of user data blocks shown, but two are shown to indicate there will almost certainly be a plurality of such blocks. Each user data block 110 and 118 is pointed to by a directory file in block 116, so that the location of user data may be obtained by control logic 58 simply by reading the directory file. The directory file is further pointed to by the reserved file in block 108 to indicate to the control logic the location of the directory file on the volume 81a. A freespace file in block 114 points to a block 112, which has been written but is no longer allocated, for example, such is the case of a file that has been marked as being erased but has not been physically removed from the disk. The freespace file further points to pre-erased free space in block 120 created for an optical disk. The erased free space in block 120 is the logical component of physical pre-erased sectors shown in physical block 104.

Environment in which Parity is Created

Referring once again to FIG. 3, a known RAIL architecture provides a useful environment for employing the present invention. The invention may also be employed in a single library without the combination of redundant libraries. Media storage unit 86 in library 92 houses a plurality of data mediums. Recall that in the context of this invention disclosure, a volume is considered synonymous with a data medium. The volume 81a contains user data for which parity must be created to enable data recovery following an error. The volume 81a is accessible for automatic mounting in any of drives 64-67 by the robotic picker 70. In a similar fashion, the picker 71 in the library 94 may access the volume 83d for mounting in any of drives 68-74. The volume 83d contains user data for which parity must be created in order to enable data recovery. The inventor has recognized that the most likely candidate for failure in any of libraries 92, 94, and 96 is a respective robotic picker belonging to that library, so the invention employs a method to take advantage of this critical recognition. For example, since the volume 81a is served by the picker 70 in the library 92, and the volume 83d is served by the picker 71 in the library 94, the invention enables the employment of a third volume 85b designated as a parity volume in the library 96. Parity data related to the volumes 81a and 83d is stored on the parity volume 85b. In this example, the data volumes 81a and 83d, and the parity volume 85, form a redundancy group denominated for the purposes of this disclosure as a "parity group". By spreading members of a parity group among multiple libraries, the present invention enables recreating data stored in a library that is not in service due to a picker failure. For example if picker 70 fails, parity volume 85b served by picker and data volume 83d served by picker 70 can be used to recreate the data stored on volume 81a.

Updating of Parity within a Parity Group.

When a data volume, such as volume 81a, is written the control logic 58 writes a message to log file 63a stored on permanent storage unit 63 to indicate that a particular range of data has been updated on the volume. The log file 63a serves to indicate to control logic 58a that parity for data stored in an address range marked as updated is no longer valid, since the parity was written before the data in the indicated range had been updated.

An important aspect for implementing the present invention is a choice of alternative embodiments for scheduling when parity is written. One scheduling embodiment involves a method of building parity "intermittently", when a predetermined event occurs, such as inactivity of the control unit 62. Another scheduling embodiment is "building all parity at one time", such as upon export of a parity group from a storage unit, such as unit 86, to a location outside of the library, such as outside of library 92 to remote storage (not shown). In either embodiment, intermittent parity building or building all parity at one time, it is necessary to mount each volume belonging to a parity group on a drive so that it may be read or written. This may be accomplished automatically by control unit 62 commanding a picker, such as picker 70, through logic 58 and further by controlling the operation of drives in the respective library, such as drives 64-67.

Build all Parity at One Predetermined Time

In one embodiment, the present invention is implemented with a method for building all of the parity data at one time. One example of a convenient time to build all of the parity data is upon exporting the volumes that comprise a parity group to a location outside of the library. This is particularly advantageous in a single library environment, such as library 92, not combined with 94 and 96, because storage space is likely to be limited in a single library. A common practice is to send volumes out of the library that have not been changed in a long while to free up storage bins. Another example is building parity for a parity group that will remain in its respective library. This is a more convenient technique to employ in the case of multiple libraries which form a RAIL environment, such as the case with the existence of libraries 92, 94, and 96. In either environment, parity is created after a host 60 update to a data volume by calculating parity for the entire range of sectors contained on the volume, irrespective of which ranges have been updated. The advantage of this technique is that on a periodic basis, such as every night at 3 a.m., parity is updated and there is no need to maintain a log file of changes, such as log file 63a. A further advantage is that a larger range of data can be written at one time, than allowed with intermittent updating, which only allows writing of parity for those ranges which have changed. Additionally, a parity_control_block, such as block 106, indicating which sector ranges are pre-erased allows for very fast writing of parity because the control logic 58 can simply avoid reading or writing data stored in pre-erased sectors.

Implementation of Building All Parity at One Time

Figure 5:
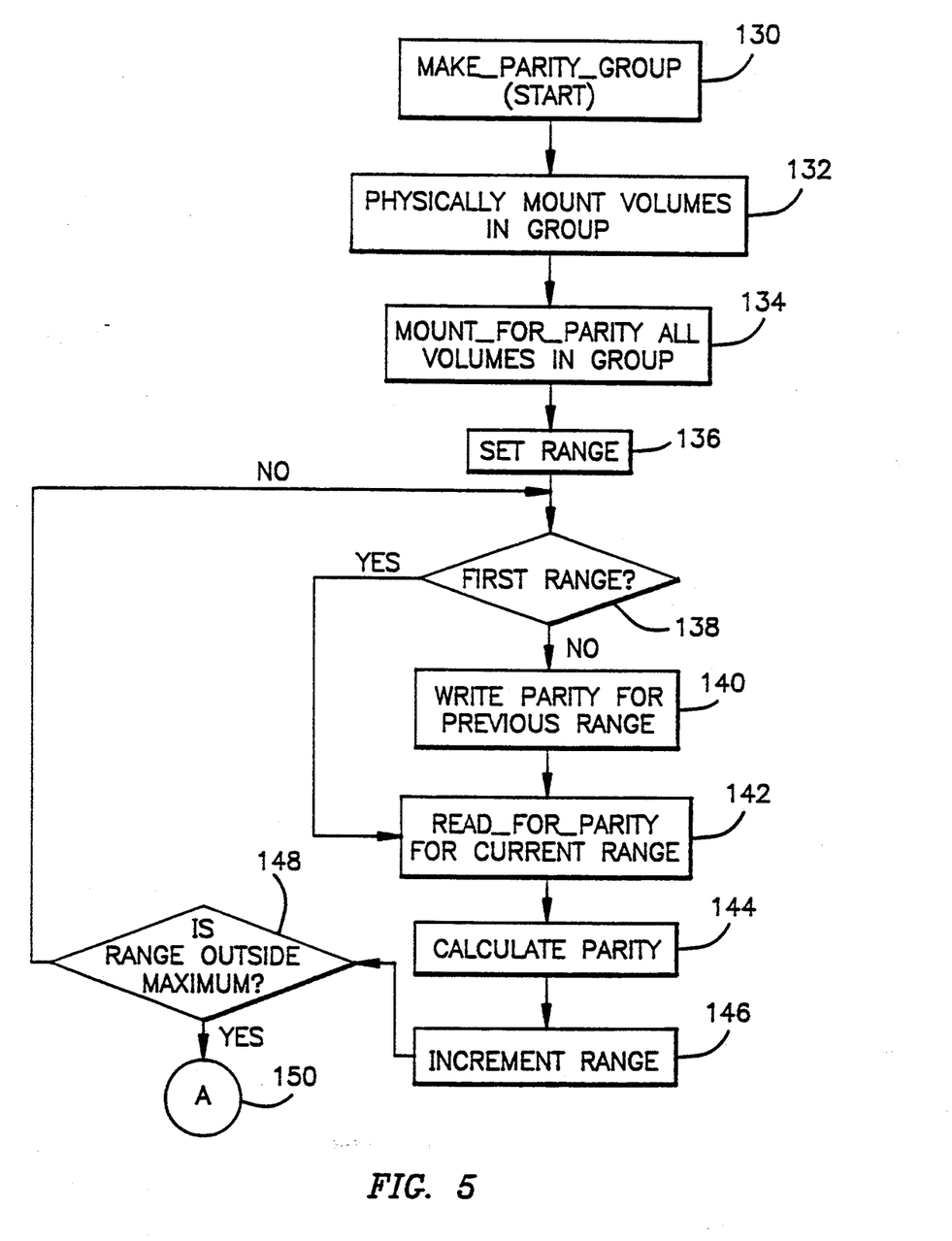
FIG. 5 is a flow chart showing an overview of a method of building all parity at one time which is useful with the present invention.

Referring to FIGS. 5 and 3, a flow chart showing a method for building all parity at one time in at least one automatic storage library is shown. The method is preferably implemented by control logic 58 in control unit 62, although it could be implemented in hardware or as microcode in a suitable microprocessor (not shown). It is envisioned that control logic 58 may be best implemented in the known C programming language with reference to the flow chart logic for purposes of coding the program. In step 130, the process is started wherein a parity group is created shown as the pseudo code statement "make_parity_group". A parity group is created by control logic 50 which reads an input list that contains an entry for each data volume in the group, and a parity volume. Following the example from above, a parity group might include, volume 81a from library 92, volume 83d from library 94, and parity volume 85b from library 96. An abbreviated general way of stating the membership of a parity group is:

parity group i-j = (volume i, volume j, parity volume i-j).

In the exemplary case, parity group$_{81a\text{-}83d}$ = (volume 81a, volume 83d, parity volume$_{81a\text{-}83d}$), where parity volume$_{81a\text{-}83d}$ = 85b. Once the parity group is created, then each volume is physically mounted in a drive, such as drive 64, so that data may be read for creating parity, as shown in step 132. The mounting can occur synchronously in a serial fashion, as would be the case for a single library with a single robotic picker or asynchronously in parallel, as would be the case for a RAIL configuration. For example, this step is implemented by the control logic 58 issuing a command to a robotic picker 70, to physically mount the volume 81a in drive 64. This is a "physical mounting" of a volume for parity as opposed to a logical mounting. In an asynchronous fashion, a simultaneous physical mounting of the other members of the parity group, volume 83d and parity volume 85b, by pickers 71 and 79 in drives 68 and 75 respectively, would also be commanded by control logic 58. A "mount for parity" refers to a mapping of free space from a volume mounted in a physical drive, and must follow a physical mounting. The free space refers to data blocks on a volume that have pre-erased sectors and also to data blocks that have unallocated written sectors. The mount for parity step, shown as a pseudo code statement "mount_for_parity", in step 134, is a routine implemented by control logic 58. The mount_for_parity routine, in a preferred embodiment, derives an independent map 61a of free space for each volume (81a, 83d, and 85b) in the parity group. In a multitasking environment, an independent operation of the mount_for_parity routine for each volume in the parity group can run simultaneously in an asynchronous fashion.

Figure 6:
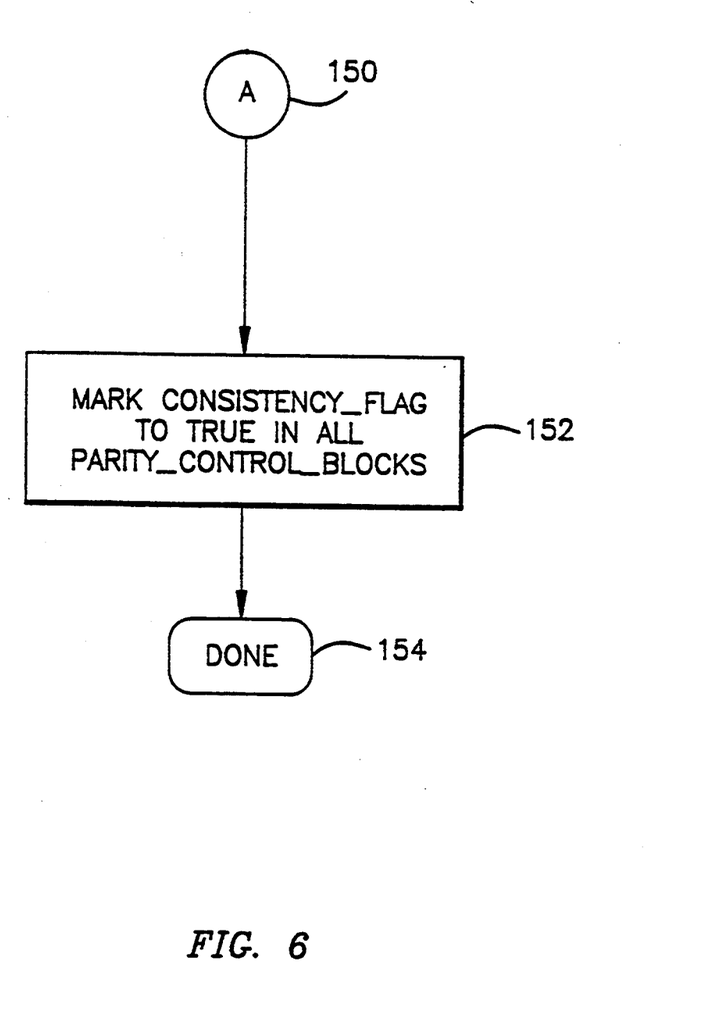
FIG. 6 is a continuation of the flow chart of FIG. 5.
Figure 7:
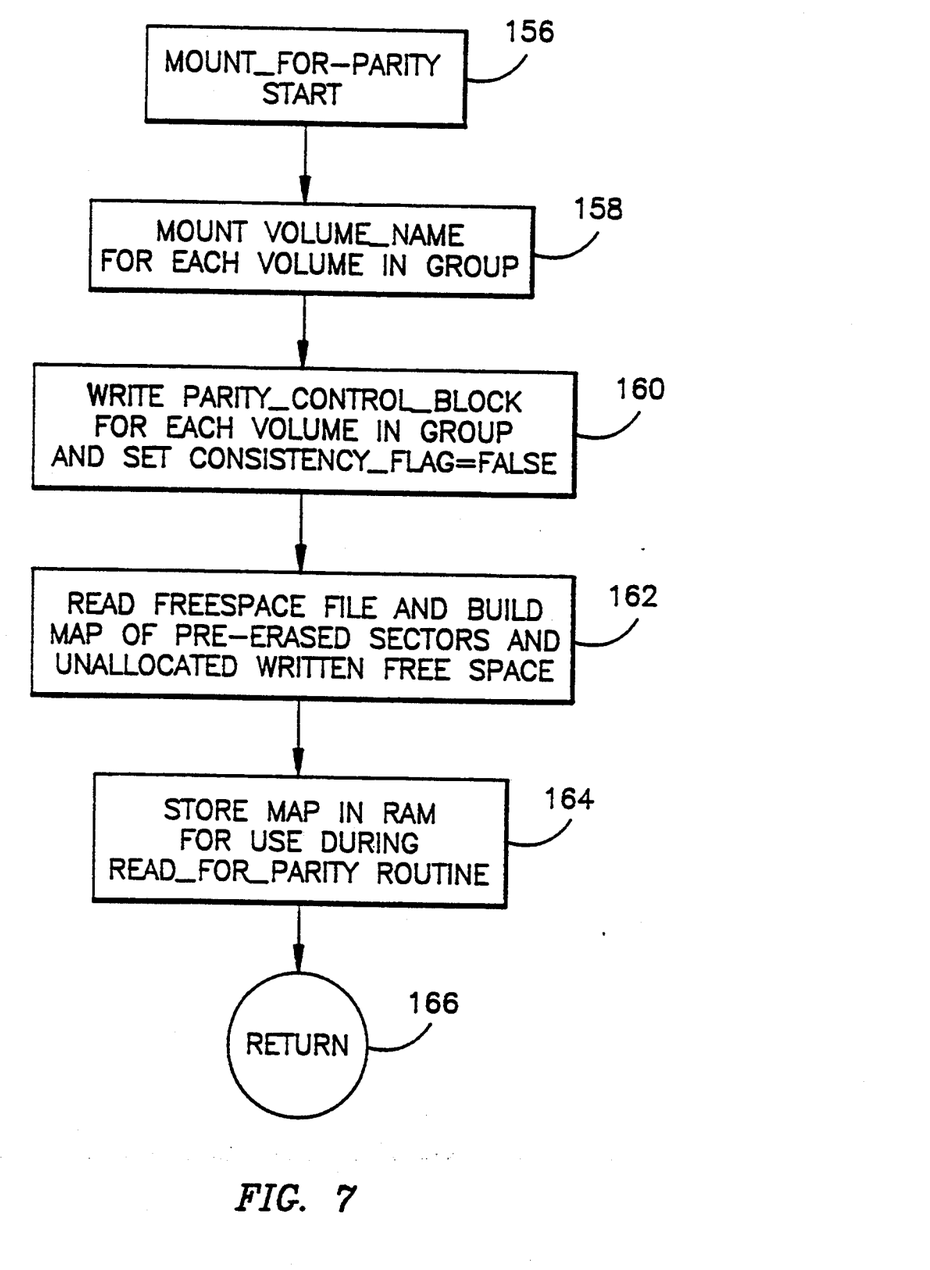
FIG. 7 is a more detailed overview of part of the flow chart of FIG. 5.

Referring to FIG. 7, the mount_for_parity routine invoked in 134 of FIG. 6 is shown in more detail. For ease of explanation, the exemplary case of volume 81a in library 92 being operated on by logic 58 for the purposes of mount_for_parity is assumed; however, it should be understood that the steps explained below apply to the general case of any data volume belonging to a parity group. In step 156, the mount_for_parity step begins in the general case by being passed the volume name. In the exemplary case, the volume name equates to an identifier for volume 81a. Each volume in the parity group can be operated on asynchronously as shown in step 158. In step 160, control logic 58 writes to parity_control_block 106 of volume 81a. The parity_control_block 106 is not striped for parity, rather it is used for controlling the parity operation. The parity_control_block 106 contains a list of the data volumes and parity volumes in the parity group, the list being denominated as the "list_of_volumes_in_group". This list can be used to determine the members of a parity group which can be helpful for error recovery purposes. Additionally the parity_control_block also contains a flag for indicating the state of data on the volume, the flag being denominated as a "consistency_flag". The consistency_flag may either indicate "true" or "false", either of which may be arbitrarily represented by a "1" or a "0". For example, a "false" consistency flag would indicate that data has been updated on the volume 81a, but parity has not yet been recalculated to reflect the update. The consistency flag may be used for error recovery, for example in a scenario where library 92 is taken out of service after data is updated on volume 81a, but prior to recalculating the parity.

Referring again to FIGS. 7, 3, and 4b, the free space map 61a indexing sectors which are pre-erased is built by control logic 58, in order to allow parity to be calculated for magneto-optical disks to be built without inducing errors. Additionally, the map 61a stored in controller electronic memory 61 includes mapping information for space which is written but unallocated, for example, as in the case of a file which has been marked as erased but not yet physically removed from the volume. Thus, in step 162 the control logic 58 reads the free space information in the freespace file in block 114 on volume 81a in order to build the map 61a of pre-erased sectors which are standard on optical disks used in magneto-optical technology, and also to build a map of unallocated space on the volume. By building the map 61a of the free space information, the pre-erased sectors and unallocated written space can be skipped when data is read for parity because an arbitrary indicator, such as a "0" for each bit within a 1024 byte sector, will be placed in a buffer 61b in electronic memory 61 by logic 58, by executing a read_for_parity routine discussed in detail below. The parity information stored in the buffer 61b can be compressed to save space. The choice of a "0" is a logical choice for indicating free space; however, a "1" could be used instead as long as it is consistent with the parity calculation technique being used. Placing information derived from the free space map in the buffer 61b is an important step that is based on the inventor's critical recognition that the control logic must be informed of erased space, or time will be wasted calculating parity. Additionally, the calculating the parity using the information on the buffer derived from the free space map avoids a likely error scenario that would result if parity is calculated without mapping and placing information in the buffer. The freespace file in block 114 contains a directory of which blocks are written but unallocated, such as written free space block 112, and of those blocks containing one or more sectors of pre-erased free space, such as block 120. For the sake of simplicity, the FBA format shown in FIG. 4b shows only one block of written free space, but an actual data volume, such as volume 81a, would contain almost certainly a plurality of such blocks. As shown in step 162 of FIG. 7, after reading the freespace file in block 114, the control logic 58 builds the map 61a in the electronic memory 61 that defines which areas of the volume 81a contain pre-erased sectors and which are unallocated. In step 164, the map is stored in electronic memory 61 and is now available for use when the volume is read in order to calculate parity, the routine of reading being denominated as "read_for_parity". Finally, a "return" step 166 signals that the mount_for_parity routine is complete.

Referring once again to FIG. 5, after the mount_for_parity routine is complete, processing continues to step 136. In step 136, the control logic 58 sets a starting sector address for a range of data for which parity will be read. For example, if due to memory constraints, only 64 sectors can be read at a time (where each sector equals 1024 bytes), then control logic 58 should be programmed to set the starting address of sector 1, since the parity_control_block is preferably in sector 0. This means that the first range would go from sector 1 to sector 64. Thus, the first range could be denoted in shorthand fashion as range$_1$=(1, 64). In step 138, control logic 50 checks to see if the range for which parity will be built is the first range on the volume. If the answer to this inquiry is "yes", then a read_for_parity_routine is implemented in step 142. The reason that the range is checked on the first pass is to set up a process where parity can be written for the previous range while data for parity is being read for the current range, as shown in step 140. Of course, this is not possible on the pass of the first range and this is why step 138 provides a branching step to 142 in the one instance of the first range being passed. In effect, parity data can be read for every volume in the parity group on a simultaneous and parallel basis and writing of parity can occur in a simultaneous and parallel basis to the read operation once the second range of data is passed into the iteration loop shown in steps 138-148.

Figure 8:
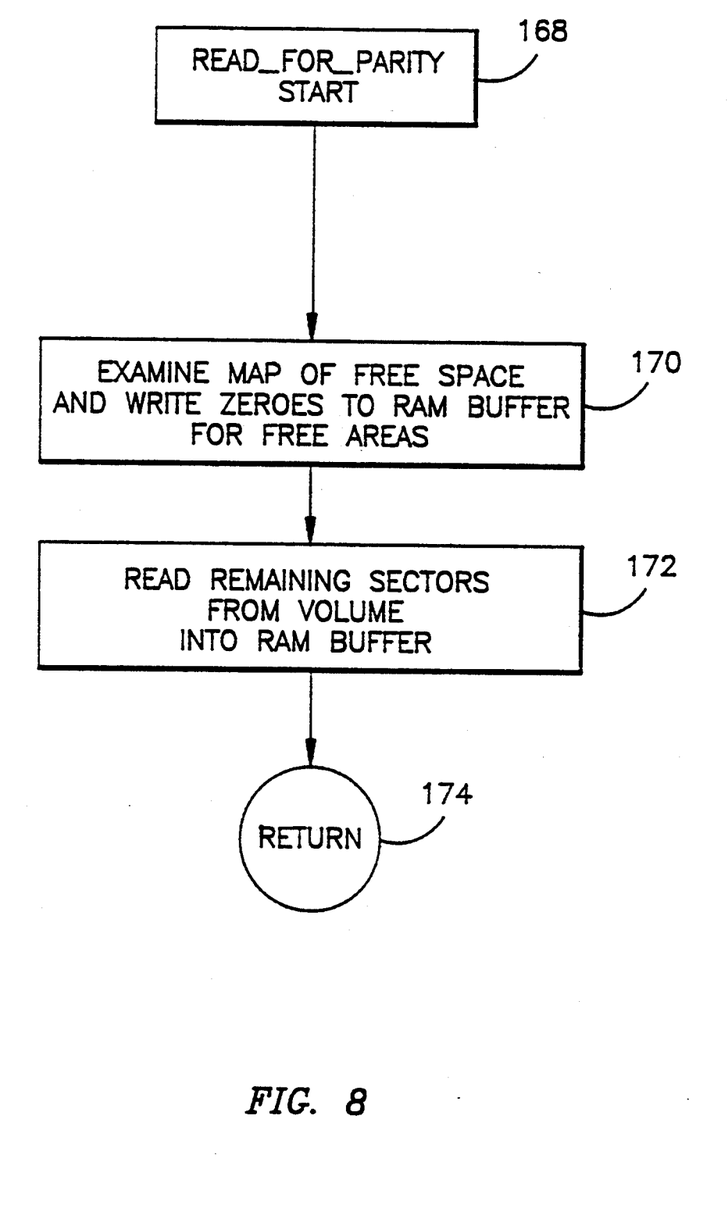
FIG. 8 is another more detailed overview of another part of the flow chart of FIG. 5.

Referring to FIGS. 5 and 8, the read_for_parity routine shown in step 142 of FIG. 5 is shown in more detail in FIG. 8. For ease of explanation, the exemplary case of volume 81a in library 92 being operated on for the purposes of mount_for_parity is assumed; however, it should be understood that the steps explained below apply to the general case of any data volume belonging to a parity group being read for parity. In step 168, the read_for_parity step begins in the general case by being passed the volume name and the range to be read. In the exemplary case, the volume name equates to a identifier for volume 81a, and the range refers to the first 64 sector range identified as (sector 1, sector 64) or simply (1, 64). In step 170, the control logic examines the map 61a built in the electronic memory 61 which contains free space information to determine if there is either written free space or pre-erased free space in the specified sector range. In the same step, the control logic writes a first set of data, preferably comprising O's, to the buffer 61b in the electronic memory 61 to indicate that identified sectors are free. In step 172, the remaining blocks in the range are read for parity and a second set of data which is a copy of the remaining blocks is stored in another buffer 61c in the electronic memory 61 by the control logic 58. Finally, a "return" step 174 signals that the read_for_parity routine is complete.

Referring once again to FIGS. 5 and 6, after the read_for_parity routine is complete, processing continues to step 144. In step 144, the control logic 58 calculates parity for the data that has been stored in the electronic memory 61 during the read_for_parity routine. Although the parity may be calculated in any manner, a common technique is to use an Exclusive Or or XOR operation. In step 146, the range is incremented. For example, the next range following the first range (1, 64), would be the second range (65, 129). In step 148, the range is tested to verify that it does not exceed the last sector address on the volume. If it does, then processing continues to continuation step 150 and no more parity is calculated. However, if the range does not exceed the last address on the volume then processing returns to step 138, and since in this case the range is no longer the first range, parity is written for the first range in step 140. Next, the read_for_parity routine is implemented for the second range by the control logic. The iteration loop is complete when all of the ranges are exhausted and processing continues to step 150. Finally, in step 152 (FIG. 6), each consistency_flag for a volume which has had parity calculated following an update is set to "true". Processing ends in step 154, and the parity group may be physically exported to remote storage outside of the library if desired.

Build Parity Intermittently

Reference is made again to FIG. 3 to explain another embodiment of the invention. In another embodiment, the invention is implemented with a method for building parity on an intermittent basis. Preferably, new parity data reflecting an update to data on a data volume is not created until the control unit 62 serving all three libraries 92, 94, and 96 is idle for a predetermined period of time. Although, waiting for the control unit to be idle is the preferred technique for minimizing decreased performance, other techniques are envisioned which would be within the spirit of the invention. For example, an algorithm could be employed to update parity groups on the basis of those containing volumes that had not been updated in a while according to a known least recently used (LRU) algorithm. In any case, once the predetermined triggering event occurs, the parity is written by control logic 58 which checks the log file 63a on permanent storage unit 63 to determine what range of data has changed on a data volume, such as data volume 81a. Once the range is determined, parity may be calculated for that range only, by mounting each volume in the respective parity group and calculating parity. It should be apparent to those skilled in the art, that keeping up with all changes and then recreating parity only when a sufficient period of inactivity has occurred in the library is more advantageous than the prior art RAID 3 architecture employed techniques which build parity every time there is an update to data on a data volume.

Implementation of Building Parity Intermittently

Figure 9:
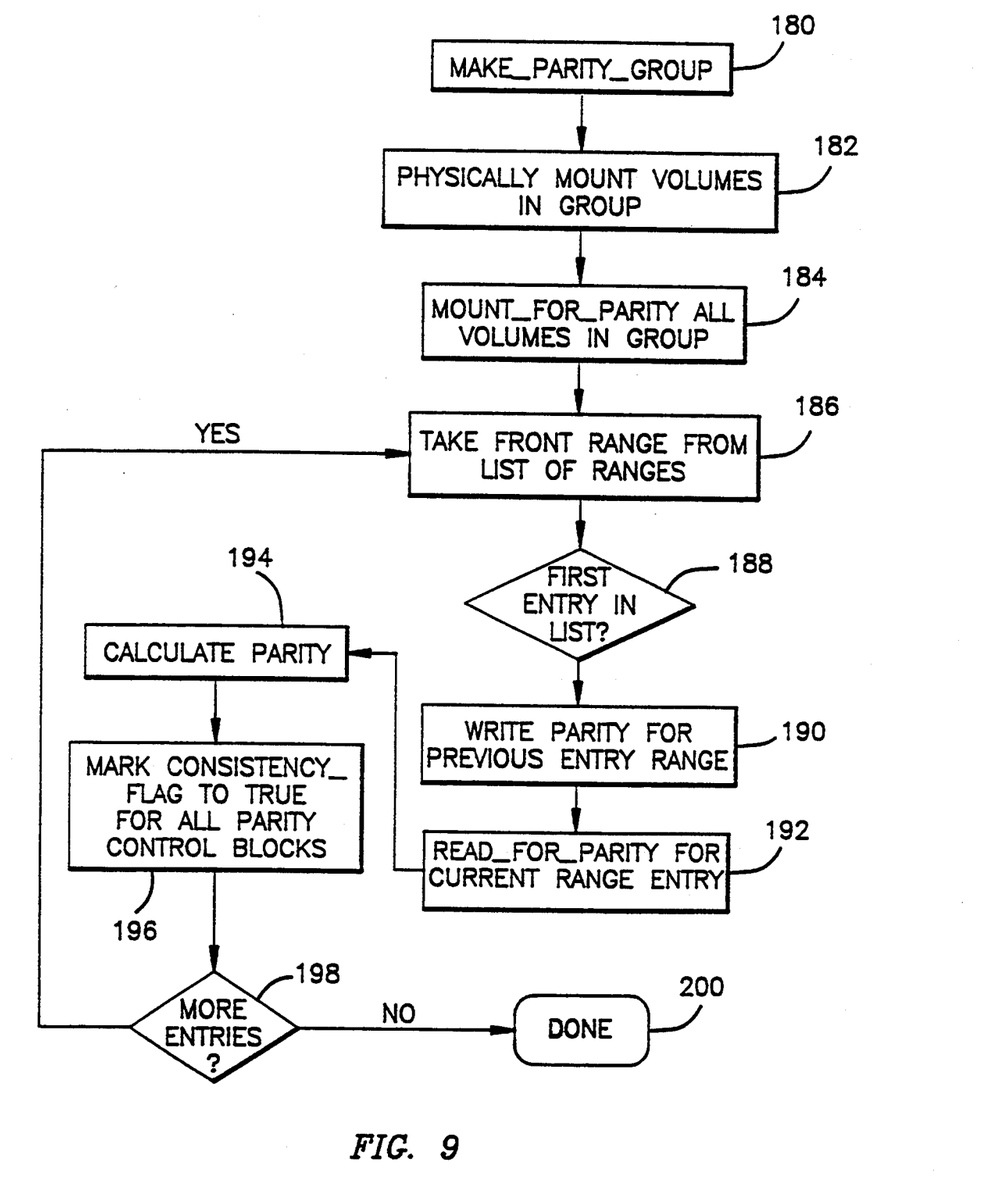
FIG. 9 is a flow chart showing an overview of a method of building parity on an intermittent basis which is useful with the present invention.

Referring to FIG. 9 an embodiment of the present invention employing a method for building parity intermittently is shown. The following flow chart is very similar to the flow chart shown in FIG. 5 and some steps, as noted, are identical to each other. This is because the primary differences between building intermittently and building all at once focuses upon the ranges for which parity is read and calculated. This is because building all parity data at once updates every range on the data volume at a predetermined time, such as a clock time (e.g., 3:00 a.m.) or a time designated as the time to export volumes from the library to a remote storage location. Whereas, building parity data intermittently only updates those ranges which have changed and at a time determined by some predetermined threshold of inactivity, such as an inactivity by control unit 62. Thus, steps 180, 182, and 184 are identical to previously-described steps 130, 132, and 134, respectively. In step 186, a list of ranges for which updates have been made is read, and the front range is extracted. For example, if the entries represent ranges in the list include the following entries, [(250, 314), (1, 64), (129, 193)], then the from range is (250, 314) because it is the first entry. In step 188, logic 58 checks to see if this is the first entry in the list. The objective of the inquiry is to determine if it is proper to write parity, i.e., at least one range has already been read for parity. Thus, if the answer to the inquiry is "yes" then parity is read for the current range which in the example is the range (250, 314). Step 190 is bypassed because the first entry is being operated on. The read_for_parity step 192 invokes the read_for_parity routine described in detail above in the description of FIG. 8. The read_for_parity routine is identical for either scheduling embodiment of the present invention. In step 194, parity is calculated for the current range in an identical fashion to previously described step 144 of FIG. 5. There is no analogous marking of the consistency flag step in the intermittent building embodiment because all ranges spanning an entire data volume is not being updated. In step 198, logic 58 checks to see if there are more entries in the list and if the answer to this inquiry is "yes" then processing begins again in step 186. In step 186 the next range is taken from the list. In the exemplary case the next front range is (1, 64). In step 188, if the inquiry to "is this the first entry in the list" is answered "no" then processing continues to 190. In step 190 parity is written for the previous entry range as described above. Processing then continues to step 192 in which case parity is read in an identical fashion as described above. Processing continues down through step 198 until there are no more entries in the list and then processing is done as shown in step 200.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawing.

What is claimed is:

1. A method for error recovery and reconstruction of data stored in data blocks on a plurality of data storage mediums stored in storage bins in one or more storage libraries, each storage library including electronic memory, a control unit coupled to the electronic memory, and one or more storage medium drives, each storage medium comprising a volume, each volume belonging to a particular parity group, each particular parity group including one or more data volumes and at least one parity volume, each storage library further having an automatic picker for transferring a volume between any drive and any storage bin, the method comprising the steps of:

providing to a storage library a request to build parity for a parity group;

mounting each volume belonging to the parity group on a respective storage medium drive of the storage library in order to build parity data on a parity volume of the parity group;

determining a location of free space on each mounted data volume of the parity group;

generating a free space map containing locations of data blocks in the data volumes having pre-erased sectors and further containing locations of data blocks in the data volumes having unallocated written sectors;

writing a first set of volume related information to a first buffer, the first set of volume related information containing the locations of data blocks in the data volumes having pre-erased sectors and the locations of data blocks in the data volumes having unallocated written sectors;

writing a second set of volume related information into a second buffer in the electronic memory, the second set of volume related information being a copy of each remaining data block that is not free space on each volume in the parity group; and calculating parity of each data volume in the parity group based on the first set of volume related data stored in the first buffer and the second set of volume related data stored in the second buffer.

2. The method of claim 1, and further comprising the step of writing the calculated parity data to the at least one parity volume belonging in the parity group.

3. The method of claim 1, wherein the first set of volume related information written to the first buffer contains a "0" for each bit in each of the preerased sectors in each mounted data volume.

4. The method of claim 2, wherein the step of determining a location of free space on each mounted data volume is preceded by the following step:

writing a parity control block to each mounted data volume in the parity group, the control block containing a consistency flag for indicating whether parity has been calculated for the mounted data volume in which the control block has been written.

5. The method of claim 4, wherein the consistency flag is set to false if the step of writing the parity data has not yet been completed.

6. The method of claim 4, wherein the consistency flag is set to true if the step of writing the parity data has been completed.

7. The method of claim 2, wherein the step of mounting each volume belonging to the parity group and the step of writing the parity data are executed in an intermittent fashion, when the following conditions are met:
at least one data block on at least one data volume in the parity group is updated by a host initiated write operation; and
a predetermined threshold period of inactivity related to the update has been satisfied.

8. The method of claim 7, wherein the predetermined threshold period of inactivity is satisfied by the control unit remaining inactive for the predetermined threshold period.

9. The method of claim 2, wherein the step of mounting each volume belonging to the parity group and the step of writing the parity data is executed at a predetermined time, and all parity data is written immediately in response to the predetermined time being reached.

10. The method of claim 9, wherein each volume in the parity group is exported from the one or more libraries after all of the parity data is written.

11. The method of claim 1, wherein parity is calculated by an Exclusive Or (XOR) operation.

12. An automated storage library, comprising:
a plurality of data storage medium storage bins;
a plurality of data storage media in the storage bins, each data storage medium comprising a volume, each volume belonging to a particular parity group, each particular parity group including one or more data volumes and at least one parity volume;
a host processor;
an electronic memory;
a control unit coupled with the electronic memory and in communication with the host processor;
a plurality of storage medium drives;
a picker for transferring a volume between any drive and any storage bin; and
parity means coupled to the control unit for building parity data to a parity volume;
the parity means including means for calculating parity by:
mounting each volume belonging to a parity group on a storage medium drive in response to a request to build parity data on a parity volume of the parity group;
determining a location of free space on each mounted data volume of the parity group;
generating a free space map in the electronic memory containing locations of data blocks in the data volumes having pre-erased sectors and further containing locations of data blocks in the data volumes having unallocated written sectors;
writing a first set of volume related information to a first buffer in the electronic memory, the first set of volume related information containing the locations of data blocks in the data volumes having pre-erased sectors and the locations of data blocks in the data volumes having unallocated written sectors;
writing a second set of volume related information into a second buffer in the electronic memory, the second set of volume related information being a copy of each remaining data block that is not free space on each volume in the parity group; and
calculating parity of each data volume in the parity group based on the first set of volume related data stored in the first buffer and the second set of volume related data stored in the second buffer.

13. The automated storage library of claim 12, wherein the parity means coupled to the control unit further comprises means for writing the calculated parity data to the at least one parity volume belonging in the parity group.

14. The automated storage library of claim 12, wherein the first set of volume related information written to the first buffer contains a "0" for each bit in each of the preerased sectors in each mounted data volume.

15. The automated storage library of claim 13, wherein the parity means coupled to the control unit further comprises means for writing a parity control block to each volume in the parity group, the control block containing a consistency flag for indicating whether parity has been calculated for the volume in which the control block has been written.

16. The automated storage library of claim 15, wherein the consistency flag is set to false if the writing of the parity data has not yet been completed.

17. The automated storage library of claim 15, wherein the consistency flag is set to true if the writing of the parity data has been completed.

18. The automated storage library of claim 13, wherein the writing of the parity data is executed intermittently when the following conditions are met:
at least one data block on at least one volume in the parity group is updated by a host initiated write operation; and
a predetermined threshold period of inactivity related to the update has been satisfied.

19. The automated storage library of claim 18, wherein the predetermined threshold period of inactivity is satisfied by the control unit remaining inactive for the predetermined threshold period.

20. The automated storage library of claim 13, wherein each volume belonging to the parity group is mounted and parity data is written for all of the data blocks on each data volume in the parity group at a predetermined time.

21. The automated storage library of claim 20, wherein each volume in the parity group is exported from the one or more libraries after the parity data is written.

22. The automated storage library of claim 12, wherein parity is calculated by an Exclusive Or (XOR) operation.

23. A library control device for building parity data in an automated storage library having a plurality of data storage medium drives and a plurality of data storage mediums, each data storage medium comprising a volume, each volume belonging to a particular parity group, each parity group having one or more data volumes and at least one parity volume, the storage library further having an automatic picker for mounting a volume in a storage medium drive, comprising:
a control processor coupled to command the automatic picker to mount a volume;
electronic memory having a first buffer area and a second buffer area;

the electronic memory storing a free space map containing locations of free space on a mounted data volume, the locations of free space indicating locations of data blocks having pre-erased sectors and further indicating locations of data blocks having unallocated written sectors;

the first buffer storing a first set of volume related information containing the locations of data blocks in the data volume having pre-erased sectors and the locations of data blocks in the data volume having unallocated written sectors;

the second buffer storing a second set of volume related information, the second set of volume related information being a copy of each remaining data block that is not free space on each volume in the parity group; and a parity calculator capable of calculating parity of each data volume in the parity group based on the first set of volume related information stored in the first buffer and the second set of volume related information stored in the second buffer.

24. The library control device of claim 23, wherein the at least one parity volume in the parity group has calculated parity data written on it.

25. The library control device of claim 23, wherein the first set of volume related information written to the first buffer contains a "0" for each bit in each of the preerased sectors in each mounted data volume.

26. The library control device of claim 24, and further comprising a parity control block written to each volume in the parity group, the control block containing a consistency flag for indicating whether parity has been calculated by the parity calculator for the volume in which the control block has been written.

27. The library control device of claim 26, wherein the consistency flag is set to false if parity data had not been written to the at least one parity volume in the parity group.

28. The library control device of claim 26, wherein the consistency flag is set to true if the writing of the parity data has been completed.

29. The library control device of claim 23, wherein the parity calculator performs parity calculation by an Exclusive Or (XOR) operation.

30. A control device for building parity data for a selected plurality of data storage mediums stored in an array environment, each data storage medium of the selected plurality of data storage mediums comprising a volume, the array environment having one or more storage medium drives for mounting thereon a storage medium, the control device comprising:

electronic memory having a first buffer area and a second buffer area;

the electronic memory storing a free space map containing locations of free space on a data volume mounted on a storage medium drive of the one or more storage medium drives, the locations of free space indicating locations of data blocks having pre-erased sectors and further indicating locations of data blocks having unallocated written sectors;

the first buffer storing a first set of volume related information containing the locations of data blocks in the data volume having pre-erased sectors and the locations of data blocks in the data volume having unallocated written sectors;

the second buffer storing a second set of volume related information, the second set of volume related information being a copy of each remaining data block that is not free space on each volume in the parity group;

a parity calculator capable of calculating parity of each data volume in the parity group based on the first set of volume related information stored in the first buffer and the second set of volume related information stored in the second buffer; and a control processor coupled to the electronic memory and the parity calculator for controlling interaction between the electronic memory and the parity calculator.

31. The control device of claim 30, wherein at least one parity volume comprised on at least one data storage medium of the selected data storage mediums has calculated parity data written on it.

32. The control device of claim 30, wherein the first set of volume related information written to the first buffer contains a "0" for each bit in each of the pre-erased sectors in each mounted data volume.

33. The control device of claim 31, and further comprising a parity control block written to each volume for which the parity data is built, the control block containing a consistency flag for indicating whether parity has been calculated by the parity calculator for the volume in which the control block has been written.

34. The control device of claim 33, wherein the consistency flag is set to false if parity data had not been written to the at least one parity volume in the parity group.

35. The control device of claim 33, wherein the consistency flag is set to true if the writing of the parity data has been completed.

36. The control device of claim 30, wherein the parity calculator performs parity calculation by an Exclusive Or (XOR) operation.

* * * * *

UNITED STATES PATENT AND TRADEMARK OFFICE
CERTIFICATE OF CORRECTION

PATENT NO. : 5,412,668
DATED : May 2, 1995
INVENTOR(S) : Dewey

It is certified that error appears in the above-indentified patent and that said Letters Patent is hereby corrected as shown below:

Column 3, line 50, change construction to --reconstruction--

Column 8, line 37, insert --79-- between "picker" and "and"
         line 38, change "70" to --71--

Column 9, line 47, change "50" to --58--

Column 17, line 37, change "had" to --has--

Signed and Sealed this

Twenty-sixth Day of December, 1995

Attest:

BRUCE LEHMAN

*Attesting Officer*      *Commissioner of Patents and Trademarks*